United States Patent Office 3,793,325
Patented Feb. 19, 1974

3,793,325
11-BASICALLY SUBSTITUTED DIBENZ[b,f][1,4]
THIAZEPINE AND DIBENZ[b,e][1,4]DIAZEPINES
Jean Schmutz, Muri, near Bern, and Fritz Hunziker, Bern,
Switzerland, assignors to Sandoz-Wander, Inc., Hanover, N.J.
No Drawing. Continuation-in-part of application Ser. No. 60,976, July 6, 1970, which is a division of application Ser. No. 769,373, Oct. 21, 1968, now Patent No. 3,539,573, which in turn is a continuation-in-part of abandoned application Ser. No. 712,956, Mar. 14, 1968. This application Feb. 23, 1972, Ser. No. 228,747
Claims priority, application Switzerland, Mar. 22, 1967, 4,103/67; May 9, 1967, 6,557/67; July 14, 1967, 10,115/67; Nov. 3, 1967, 15,453/67; Feb. 14, 1968, 2,201/68
Int. Cl. C07d 51/70
U.S. Cl. 260—268 TR       6 Claims

ABSTRACT OF THE DISCLOSURE

Dibenz [b,f][1,4] thiazepines and dibenz [b,e][1,4] diazepines, basically substituted at the 11-position and substituted at the 2-position with alkylsulphinyl or alkylsulphonyl are useful as neuroleptics and anti-emetics.

This application is a continuation-in-part of copending patent application Ser. No. 60,976, filed July 6, 1970 which is a divisional application of then copending application Ser. No. 769,373, filed Oct. 21, 1968 which issued as U.S. Pat. No. 3,539,573 on Nov. 10, 1970, which in turn was a continuation-in-part of then copending application Ser. No. 712,956, filed Mar. 14, 1968, now abandoned.

This invention is generally concerned with new heterocyclic compounds, and more specifically with new 11-basically substituted dibenzo [b,f][1,4] thiazepines and dibenzo [b,e][1,4] diazepines of the formula:

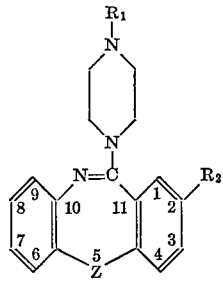

(I)

and acid addition salts thereof. In Formula I, Z denotes sulphur, sulphinyl (—SO—) or imino (—NH—), $R_1$ represents hydrogen, allyl, alkyl containing not more than 3 carbon atoms, hydroxyalkyl containing not more than 3 carbon atoms, alkoxyalkyl containing not more than 6 carbon atoms or alkoyloxyalkyl containing not more than 6 carbon atoms. $R_2$ represents alkylsulphinyl of the formula —$SOR_3$ in which $R_3$ denotes alkyl with not more than 3 carbon atoms; or alkylsulphonyl of the formula —$SO_2R_3$ in which $R_3$ denotes alkyl with not more than 3 carbon atoms.

Compounds of Formula I are obtained when a compound of the formula:

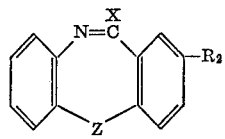

(II)

wherein Z and $R_2$ have the meaning defined above and X denotes a residue capable of being split off with the hydrogen of amines, is reacted with piperazine or piperazine derivatives, respectively, of the formula:

(III)

wherein $R_1$ has the above-mentioned meaning. A residue capable of being split off with the hydrogen of amines, which can be bound ionically or covalently to the carbon atom, can most conveniently be represented by halogen, sulphydryl, or alkoxy and alkylthio which may be activated, e.g. methoxy, thiomethyl or p-nitrobenzylthio, or by tosyl. Starting materials of the Formula II are obtained by converting lactams of the formula:

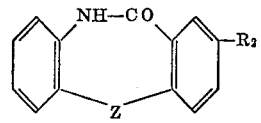

(IV)

wherein Z and $R_2$ have the meaning given above, into the thio-lactams by treatment with phosphorus pentasulfide which may be followed by alkylation, or by reaction of the lactams with a halogenating agent such as phosphorus oxychloride or phosphorus pentachloride, most suitably in the presence of a catalytic amount of dimethylaniline or dimethylformamide. Lactams of Formula IV are themselves obtained by ring closure of compounds of the formula:

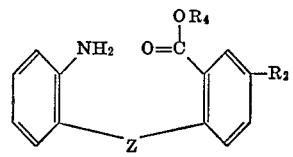

(V)

wherein Z and $R_2$ have the above-mentioned meaning and $R_4$ denotes hydrogen or lower alkyl. For products wherein Z represents —S—, lactams of Formula IV may also be obtained by ring closure of compounds of the formula:

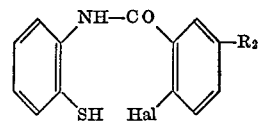

(VI)

wherein Hal stands for halogen, or of isocyanates of the formula:

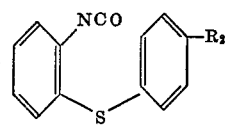

(VII)

Compounds of Formula I may further be obtained by ring closure through intramolecular condensation of acid amides or acid thioamides of the formula:

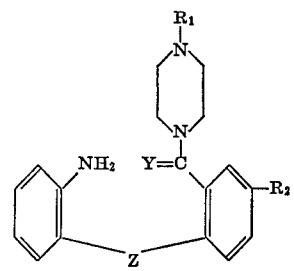

(VIII)

wherein Z, $R_1$ and $R_2$ have the above-mentioned meaning and Y represents oxygen or sulphur. A purely thermal condensation rarely succeeds with the acid amides but rather with the thioamides which are, for example, obtained from the acid amides by treatment with phosphorus pentasulphide and need not be isolated before the following condensation. Especially in the case of the acid amides it is desirable to perform the ring closure in the presence of condensing agents, such as phosphorus pentachloride, phosphorus oxychloride, phosgene, polyphosphoric acid, and the like. It is assumed that the ring closure proceeds by way of intermediate steps such as imidochlorides, amidochlorides, imidophosphates, amidophosphates or salt-like derivatives thereof, which, in general, are not isolatable. The condensation of the thioamides is favored by the presence of mercury(II) salts or by intermediate formation of imidothioethers which may be activated. Heating and, if required, the use of a suitable inert solvent are desirable, and when using phosphorus oxychloride and phosphorus pentachloride addition of catalytic amounts of dimethylformamide or dimethylaniline. 11-basically substituted dibenzo [b,f][1,4] thiazepines (compounds of Formula I in which Z is —S—) can also be obtained by dehydration of urea derivatives of the formula:

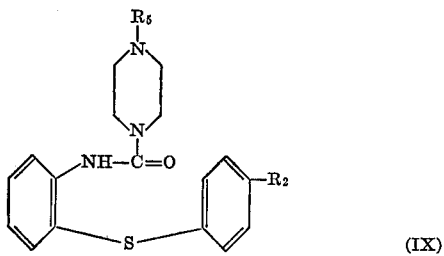

(IX)

wherein $R_2$ has the above-mentioned meaning and $R_5$ means $R_1$ or denotes a removable group, especially a hydrolytically removable group. The ring closure is preferably carried out by heating in the presence of dehydrating agents such as zinc chloride, aluminium chloride, stannic chloride, phosphoric acid, polyphosphoric acid and the like, especially phosphorus oxychloride or phosphorus oxychloride and phosphorus pentoxide, if desired in an inert solvent of suitable boiling point such as benzene or toluene etc. According to the chosen reaction conditions the starting materials of Formula IX with a hydrolytically removable group $R_5$, e.g. carboalkoxy, especially carbethoxy, are cyclized directly to the 11-(1-piperazinyl) compounds by hydrolysis of the removable group. Other removable groups can be split off after ring closure in a way known per se, e.g. by hydrogenolysis. The products of Formula I can also be obtained when amidines of the formula:

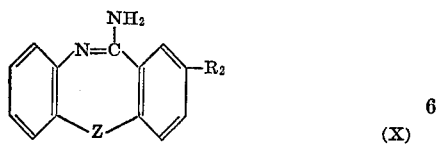

(X)

wherein Z and $R_2$ have the above-mentioned meaning, are treated with a reactive ester of an alcohol of the formula:

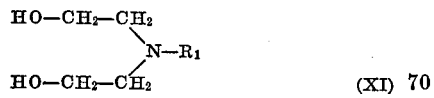

(XI)

wherein $R_1$ has the above-mentioned meaning. The reaction is carried out following or by simultaneous treatment with a basic catalyst or metallization agent such as sodamide, lithium amide, sodium hydride, butyl lithium, phenyl sodium, sodium ethylate or potassium-t-butoxide. Suitable esters are those of inorganic or organic acids, e.g. hydrohalic acid, sulphonic acid or carbonic acid esters. The required amidines X are in turn obtained by treating compounds of Formula II with ammonia. Compounds of formula I, wherein Z denotes sulphinyl, are also obtained by oxidation, e.g. with periodates, of the corresponding compounds in which Z represents sulphur. Finally, the compounds of Formula I, wherein $R_2$ represents alkylsulphinyl or alkylsulphonyl, respectively, can also be obtained by mild (e.g. with periodates) or strong (e.g. with hydrogen peroxide or peracetic acid) oxidation of the corresponding thioalkyl compounds. Products wherein $R_2$ represents alkylsulphonyl are also obtainable by strong oxidation of the corresponding alkylsulphinyl compounds. If the oxidation is carried out on the dibenzo [b,f][1,4] thiazepines (Z=—S—) then, according to the type of oxidizing agent used, the corresponding thiazepine sulphoxides (Z=—SO—) are obtained. Compounds of Formula I, obtained according to one of the above methods, wherein $R_1$ represents hydrogen can be converted to such compounds wherein $R_1$ does not represent hydrogen, e.g. by treatment with reactive esters of alcohols of the formula $R_1$—OH. Hydrohalic acid or toluenesulphonic acid esters are suitable for this purpose. An alkyl group $R_1$ can also be introduced by the method of reductive alkylation, i.e. by reaction with corresponding aldehydes either with hydrogen in the presence of a catalyst or with a reducing agent such as formic acid. The introduction of a hydroxyalkyl group $R_1$ can also be carried out by treating with a corresponding alkylene oxide. Compounds of Formula I in which $R_1$ denotes a hydroxyalkyl group can be subsequently treated with an acylating agent to obtain products wherein $R_1$ represents an alkoyloxyalkyl group. Acid chlorides and acid anhydrides are especially suitable as acylating agents.

Many of the compounds of Formulas II, III, IV, V, VI, VII, VIII, IX, X and XI are known and may be prepared by procedures described in the literature. The compounds of Formulas II, III, IV, V, VI, VII, VII, IX, X and XI not specifically disclosed may be prepared by analogous methods using known starting materials or by methods generally disclosed herein using standard techniques.

The bases obtained in this manner are in most cases crystallizable or can otherwise be distilled in high vacuum without decomposition and react with inorganic and organic acids such as hydrochloric acid, hydrobromic acid, sulphuric acid, nitric acid, phosphoric acid, acetic acid, oxalic acid, maleic acid, succinic acid, tartaric acid, toluene sulphonic acid and the like to form addition salts which are stable in water, in which form the products may also be used. The bases obtained in the described manner and their acid addition salts are new compounds which can be used as active substances in pharmaceuticals or as intermediates for the production of such substances. They produce a favorable effect on the central nervous system and may therefore especially be used as neuroleptics and antiemetics. The antiemetic activity is shown pharmacologically by a strong apomorphine antagonizing effect in dogs and rats as well as a comparatively weak cataleptic and locomotor activity suppressing effect. Pronounced antiemetic activity is shown by 2-methylsulphonyl-11-(4-methyl-1-piperazinyl)-dibenzo [b,f][1,4] thiazepine and its acid addition salts. The compounds of this invention can be administered in the form of pharmaceutical preparations containing, besides the active substance, organic or inorganic solid or liquid carriers suitable for enteral or parenteral administration. The pharmaceutical preparations may be, for example, in the form of tablets, dragees, or solutions for injection.

In general, satisfactory results are obtained when these compounds are administered at a daily dosage of about 0.07 milligram to about 50 milligrams per kilogram p.o.

of animal body weight. For most large mammals such as primates, the total daily dosage is from about 5 milligrams to about 400 milligrams. Dosage forms suitable for internal use comprise from about 10 milligrams to about 25 milligrams of the active compound in intimate admixture with a solid or liquid pharmaceutically acceptable carrier or diluent.

EXAMPLE 1

5.2 of 2-methylsulphenyl-10,11-dihydro-11-oxo-dibenz [b,f][1,4] thiazepine and 1.8 ml. of N-N-dimethylaniline are refluxed in 50 ml. of phosphorus oxychloride for 5 hours after which the reaction mixture is evaporated to dryness in vacuo. The residue is treated with xylene, once again evaporated and then dissolved in xylene and poured onto ice. The aqueous phase is shaken out three times with xylene. The combined xylene extracts are washed with dilute hydrochloric acid, water and aqueous sodium chloride solution, dried over sodium sulphate, treated with active charcoal and filtered through a small amount of aluminium oxide. The filtrate is concentrated and then refluxed with 12 ml. of N-methyl-piperazine for 6 hours. The reaction mixture is treated with water and concentrated soda lye and shaken out twice with large amounts of ether. The ether extracts are washed several times with water and then shaken out with dilute hydrochloric acid. The acid extracts are made alkaline and extracted twice with ether. The ether phase is washed with water and aqueous sodium chloride solution, dried over sodium sulphate, treated with activated charcoal and filtered through a small amount of aluminium oxide. The filtrate is concentrated and treated with petroleum ether. The crystals which precipitate are dissolved in acetone and, after concentrating, recrystallized by addition of ether/petroleum ether to yield 2-methylsulphonyl-11-(4-methyl-1-piperazinyl)-dibenz [b,f][1,4] thiazepine (M.P. 219–223° C.)

Following the above procedure but using an equivalent amount of piperazine, β-hydroxyethylpiperazine, β-methoxyethylpiperazine or N-allylpiperazine in place of the N-methylpiperazine, there is obtained 2 - methylsulphonyl-11-(1-piperazinyl)-dibenz [b,f][1,4] thiazepine, 2-methylsulphonyl-11-(4 - β - hydroxyethyl-1-piperazinyl)-dibenz [b,f][1,4] thiazepine, 2-methylsulphonyl-11-(4-β-methoxyethyl-1 - piperizinyl)dibenz[b,f][1,4] thiazepine or 2-methylsulphonyl - 11 - (4-allyl-1-piperizinyl)dibenz [b,f][1,4] thiazepine respectively.

When the 2-methylsulphonyl - 11 - (4-β-hydroxyethyl-1-piperizinyl)-dibenz [b,f][1,4] thiazepine is treated with acetic anhydride using conventional techniques there is obtained 2 - methylsulphonyl-11-(4-β-acetoxyethyl-1-piperazinyl dibenz [b,f]][1,4] thiazepine.

Treatment of 2-methylsulphonyl-11- (1-piperizinyl)-dibenz [b,f][1,4] thiazepine with ethylene oxide in benzene yields 2 - methylsulphonyl-11-(4-β-hydroxyethyl-1-piperazinyl)-dibenz [b,f][1,4] thiazepine.

EXAMPLE 2

A mixture of 5.5 g. of 2-methylsulphonyl-10,11-dihydro-11-mercapto-5H-dibenz[b,e]-1,4 - diazepine and dry potassium-t-butoxide is heated under reflux in 60 ml. of dioxane for 1 hour. After cooling, a solution of 3.2 g. of p-nitro-benzylchloride in 10 ml. of dioxane is added dropwise with stirring to the reaction mixture. Stirring is continued for 2 hours at 60° C. 10 ml. of N-methylpiperazine and 3 drops of glacial acetic acid are then added to the reaction mixture which is then heated under reflux for 24 hours. The reaction mixture is then mixed with 1 N glacial acetic acid and maintained at a temperature of about 80° C. for a short period. The non-basic portions are filtered off and the filtrate is clarified with activated charcoal. The filtrate is rendered alkaline with a concentrated ammonia solution and the precipitated base filtered off.

The basic residue, 2-methylsulphonyl-11-(4-methyl-1-piperazinyl)-dibenz [b,e,][1,4] diazepine, is treated with hydrobromic acid to obtain the dihydrobromide which, after recrystallization from methanol/acetic acid ester has a M.P. of 225–230° C.

Following the above procedure but using an equivalent amount of piperazine, β-hydroxyethypiperizine, β-methoxyethylpiperazine or N-allylpiperazine in place of the N-methylpiperazine, there is obtained 2-methylsulphonyl-11-(1-piperizinyl)-dibenz [b,e][1,4] diazepine, 2-methylsulphonyl-11-(4-β-hydroxyethyl - 1 - piperizinyl) dibenz [b,e][1,4] diazepine, 2-methylsulphonyl-11-(4-β-methoxyethyl - 1 - piperizinyl)dibenz [b,e][1,4] diazepine or 2-methylsulphonyl-(4 - allyl-1-piperizinyl)dibenz [b,e][1,4] diazepine respectively.

When the 2 - methylsulphonyl-11-(4-β-hydroxyethyl-1-piperizinyl)dibenz [b,e,][1,4] diazepine is treated with acetic anhydride using conventional techniques there is obtained 2 - methylsulphonyl-11 - (4-β-acetoxyethyl-1-piperizinyl)-dibenz [b,e][1,4] diazepine.

Treatment of 2 - methylsulphonyl-11-(1-piperizinyl)dibenz [b,e][1,4] diazepine with ethylene oxide in benzene yields 2-methylsulphonyl-11-(4 - β-hydroxyethyl-1-piperizinyl)-dibenz [b,e][1,4] diazepine.

EXAMPLE 3

A mixture of 3.8 g. of 2-aminodiphenylamine-4'-methylsulphonyl-2'-carboxylic acid-(4''-methyl)piperazide, 20 ml. of phosphorus oxychloride and 1 ml. of N,N-dimethylaniline is heated under reflux for 3 hours. The excess phosphorus oxychloride is removed from reaction mixture by vacuum distillation. The resulting residue is taken up in xylene and poured into a mixture of ice and water. The xylene phase is separated from the water, evaporated to dryness, and the residue is shaken with benzene and a hydrochloric acid solution. The benzene phase is exhaustively extracted with hydrochloric acid solution; the hydrochloric acid extracts are combined and rendered alkaline with an ammonia solution. The resulting precipitated base is filtered off and washed with water. The base is taken up in a large volume of ether and the ether solution is dried over sodium sulfate. After the evaporation of the ether, the residue is recrystallized from ether/petroleum ether.

2 - methylsulfonyl-11-(4'-methyl-1-piperazinyl)-5H-dibenzo [b,e][1,4] diazepine.2HBr has a melting point of 225–230° C.

EXAMPLE 4

3 g. of 2-(4''-methyl-1''-piperazinyl-carbonylamino)-4'-methylsulphonyldiphenylsulfide and a mixture of 2 g. of phosphorus pentoxide and 10 ml. of phosphorus oxychloride are refluxed for 24 hours. The excess phosphorus oxychloride is then distilled off in vacuo and the residue decomposed with ice/water. The solution obtained is made alkaline with concentrated soda lye and shaken out with ether. The ether extracts are washed with water and shaken out thoroughly with dilute hydrochloric acid. The acid extracts are made alkaline with concentrated soda lye and shaken out with chloroform. The chloroform extracts are washed with water, dried over sodium sulphate and evaporated to dryness in vacuo. The residue is crystallized from acetone/petroleum ether and gives 1.5 g. of 2-methylsulphonyl - 11 - (4-methyl-1-piperazinyl)-dibenz [b.f][1,4] thiazepine of melting point 178–179° C. identical to the product obtained according to Example 1.

EXAMPLE 5

The free base obtained from 6.83 g. of 2-thiomethyl-11-(4-methyl-1-piperazinyl)-dibenz [b,e][1,4] diazepine prepared by the procedure of Example 2 using appropriate starting materials is dissolved in 40 ml. of water and 10 ml. of glacial acetic acid. This solution is treated dropwise while stirring at 0° C. with a solution of 3.42 g. of sodium metaperiodate in 10 ml. of water. After the addition is complete the reaction mixture is left to stand at room temperature for 24 hours, then made alkaline with concentrated soda lye and shaken out with ether. The ether extracts are washed with water and then exhaustively shaken out with dilute hydrochloric acid. The acid extracts are made alkaline with concentrated soda lye and shaken out with chloroform. The chloroform extracts are washed with water, dried over sodium sulphate and evaporated to dryness in vacuo. The residue is dissolved in acetone and treated with 1.8 g. of maleic acid. After concentration and addition of ether, crystals precipitate which are recrystallized from methanol/acetone/ether to give 6.9 g. of 2-methylsulphinyl - 11 - (4-methyl-1-piperazinyl)-dibenz [b,e][1,4] diazepine maleate.

Further products corresponding to Formula I given in the following table are obtained by analogous procedures to those given above. In the table Z, $R_1$ and $R_2$ have the above defined meaning. In the column on the right hand side ac means acetone, e=ether, ch=chloroform, me=methanol and pe=petroleum ether.

TABLE

| Ex. | Z | $R_1$ | $R_2$ | Melting point |
|---|---|---|---|---|
| 6 | —S— | H | —SO$_2$CH$_3$ | Base: 180–183° C. (from ch/pe). |
| 7 | —S— | —CH$_3$ | —SO$_2$C$_2$H$_5$ | Base: 169–170° C. (from ch/pe). |
| 8 | —S— | H | —SO$_2$C$_2$H$_5$ | Maleate: 180–185° C. (from me/ac/e). |
| 9 | NH | H | —SO$_2$CH$_3$ | Dihydrobromide: 233–248° C. (from me/ethyl acetate). |

EXAMPLE 10

For the manufacture of tablets, the products of this invention can be mixed with lactose and granulated with water, 0.5% sodium alginate or 1% gelatin solution. The dried granulate is compressed into tablets in the presence of about 5% of talcum, 5% of corn starch and 0.1% of magnesium stearate. In this way, there are obtained, e.g. tablets of the following composition:

2 - methylsulphonyl - 11 - (4-methyl-1-piperazinyl)-
   dibenz [b,f][1,4]thiazepine _____ 10
Lactose _____ 70
Talcum _____ 5
Magnesium stearate _____ 0.1

These 90 mg. tablets, which are provided with a crack-line, can be administered orally in a dosage of one-half to two tablets one to three times per day in the treatment of subjects suffering from nausea and vomiting following operations or ray treatment or due to stomach or metabolism disorders, intoxications, drug incompatibility, pressure on the brain or pregnancy. These tablets may also be used prophylactically against post operative vomiting.

EXAMPLES 11 AND 12

Sterile suspension for injection and oral liquid suspension

The following pharmaceutical compositions are formulated with the indicated amount of active agent using conventional techniques. The injectable suspension and the oral liquid suspension represent formulations useful as unit doses and may be administered in the treatment of emesis. The injectable suspension is suitable for administration once a day whereas the oral liquid suspension is suitably administered 2 to 4 times per day for this purpose.

| | Weight (mg.) of— | |
|---|---|---|
| | Sterile injectable suspension | Oral liquid suspension |
| 2-methylsulphonyl-11-(4-methyl-1-piperazinyl) - dibenz - [b,f] [1,4]thiazepine. | 10 | 10. |
| Sodium carboxymethylcellulose U.S.P. | 1.25 | 12.5. |
| Methyl cellulose | 0.4 | |
| Polyvinylpyrrolidone | 5 | |
| Lecithin | 3 | |
| Benzyl alcohol | 0.01 | |
| Magnesium aluminum silicate | | 47.5. |
| Flavor | | Q.w. |
| Color | | Q.s. |
| Methyl paraben, U.S.P | | 4.5. |
| Propyl paraben, U.S.P | | 1.0. |
| Polysorbate 80 (e.g. Tween 80) U.S.P | | 5. |
| Sorbitol solution, 70% U.S.P | | 2,500. |
| Buffer agent to adjust pH for desired stability. | Q.s | Q.s. |
| Water | For injection q.s. to 1 ml. | Q.s. to 5 ml. |

EXAMPLES 13 AND 14

Tablets and capsules suitable for oral administration

Tablets and capsules containing the ingredients indicated below may be prepared by conventional techniques and are useful in treating emesis at a dose of one tablet or capsule 2 to 4 times a day.

| Ingredient | Weight (mg.) of— | |
|---|---|---|
| | Tablet | Capsule |
| 2-methylsulphonyl-11 -(4-methyl-1 -piperazinyl) -dibenz[b,f][1,4]diazepine. | 10 | 10 |
| Tragacanth | 10 | |
| Lactose | 237.5 | 290 |
| Corn starch | 25 | |
| Talcum | 15 | |
| Magnesium stearate | 2.5 | |
| Total | 300 | 300 |

We claim:
1. The compound which is 2-methylsulphonyl-11-(4-methyl-1-piperazinyl)-dibenzo [b,f][1,4] thiazepine and its pharmaceutically useful acid addition salts.
2. The compound which is 2-methylsulphonyl-11-(1-perazinyl)-dibenzo [b,f][1,4] thiazepine and its pharmaceutically useful acid addition salts.
3. The compound which is 2-ethylsulphonyl-11-(4-methyl-1-piperazinyl)-dibenz [b,f][1,4] thiazepine and its pharamceutically useful acid addition salts.
4. The compound which is 2-ethylsulphonyl-11-(1-piperazinyl)-dibenzo [b,e][1,4] diazepine and its pharmaceutically useful acid addition salts.
5. The compound which is 2-methylsulphonyl-11-(4-methyl-1-piperazinyl)-dibenzo [b,e][1,4] diazepine and its pharmaceutically useful acid addition salts.
6. The compound which is 2-methylsulphonyl-11-(1-piperazinyl)-dibenzo [b,e][1,4] diazepine and its pharmaceutically useful acid addition salts.

References Cited

UNITED STATES PATENTS

| 3,084,160 | 4/1963 | Jacob | 260—268 |
| 3,268,557 | 8/1966 | Weber | 260—268 TR |
| 3,458,516 | 7/1969 | Howell et al. | 260—268 TR |
| 3,462,436 | 8/1969 | Fouche | 260—268 TR |
| 3,546,226 | 12/1970 | Schmutz et al. | 260—268 TR |

DONALD G. DAUS, Primary Examiner

U.S. Cl. X.R.

424—250

UNITED STATES PATENT OFFICE
CERTIFICATE OF CORRECTION

Patent No. 3,793,325        Dated February 19, 1974

Inventor(s) JEAN SCHMUTZ, ET. AL.

It is certified that error appears in the above-identified patent and that said Letters Patent are hereby corrected as shown below:

On the cover sheet insert -- The portion of the term of this patent subsequent to Sept. 11, 1990, has been disclaimed. -- .

Signed and sealed this 21st day of January 1975.

(SEAL)
Attest:

McCOY M. GIBSON JR.            C. MARSHALL DANN
Attesting Officer              Commissioner of Patents

FORM PO-1050 (10-69)